United States Patent [19]

Neureither

[11] Patent Number: 5,957,295
[45] Date of Patent: Sep. 28, 1999

[54] APPARATUS AND METHOD FOR THE PROCESSING OF REFUSE MIXTURES INCLUDING PLASTIC WASTE

[75] Inventor: Jochen Neureither, Heidelberg, Germany

[73] Assignee: Baker Hughes (Deutchland) GmbH, Germany

[21] Appl. No.: 09/008,379

[22] Filed: Jan. 16, 1998

[30] Foreign Application Priority Data

Jan. 18, 1997 [DE] Germany ............................ 197 01 669

[51] Int. Cl.$^6$ ........................................................ B03B 5/00
[52] U.S. Cl. .............................. 209/3; 209/724; 209/930; 241/20; 241/24.1; 241/38; 241/DIG. 38
[58] Field of Search ................................. 209/3, 208, 210, 209/724, 725, 930; 241/20, 24.1, 38, DIG. 38

[56] References Cited

U.S. PATENT DOCUMENTS 5,104,047  4/1992  Simmons .................................. 241/20
5,143,308  9/1992  Hally et al. .......................... 209/930 X
5,598,980  2/1997  Dilly-Louis et al. ..................... 241/20

FOREIGN PATENT DOCUMENTS 4-229210  8/1992  Japan ......................................... 209/3

*Primary Examiner*—Tuan N. Nguyen
*Attorney, Agent, or Firm*—R. Neil Sudol; Henry D. Coleman

[57] ABSTRACT

The present invention discloses an apparatus and method for the processing of refuse mixtures which may include relatively high concentrations of plastic waste, such as refuse mixtures including waste packages originating from household refuse and industrial refuse and especially refuse mixtures including plastic waste in the form of sheeting, hollow bodies, beakers and composite materials whereby the solids of the refuse mixture are comminuted, the comminuted refuse mixture is then moistened, mechanically disintegrated, mixed with a separating fluid and then dewatered and separated by density by a sorting centrifuge thereby obtaining a plastic fraction which is free of impurities.

6 Claims, 1 Drawing Sheet

APPARATUS AND METHOD FOR THE PROCESSING OF REFUSE MIXTURES INCLUDING PLASTIC WASTE

BACKGROUND OF THE INVENTION

The present invention relates to an apparatus and method for the processing of refuse mixtures including plastic waste, in particular mixtures including a high concentration of plastics waste and/or mixtures of waste packages originating from different collection systems, e.g. from household refuse and industrial refuse, predominantly including plastics in the form of sheeting, hollow bodies, beakers and composite materials, including plastics that may have been contaminated by mineral heavy media such as sands or metal waste.

Certain processes which include wet process operations are known for the reprocessing of these manifold waste mixtures on a technical scale. They are targeted at the recovery of pure-grade plastics as secondary raw materials. The objective of these known methods is to arrive, after several process operations, at a concentration of the plastic waste fractions to be recovered to be followed by a separation of the same by their density.

WO-91/04100 describes a method and an apparatus for the separation of plastic waste by its density via sink-float separation where the substances to be separated are fed at one end into a tank and the floats are withdrawn at the other end of the tank. Drawbacks of this known method are the complicated design of the separating device and the unsatisfactory precision of cut due to the turbulence caused by a belt conveyor running in the separating liquid.

The apparatus disclosed in DE-A-42 08 104 yields a significant improvement to the previously described method. In this case, the suspension, which is made up of the solids to be separated and a separating liquid, is fed centrally into a rotating centrifuge and the solids to be separated are discharged at the two centrifuge ends, substantially separated from the separating liquid. Although separation by density can be carried out in an optimal manner in this known sorting centrifuge, the substances to be separated definitely require an appropriate primary treatment.

For groups of substances obtained from certain process operations, such as plastic waste contaminated with paper, plastic contaminated with wood, composite materials (plastic/paper) and plastic waste characterized by strongly adhering contaminants which can be removed with water, the currently known methods may include friction separators, turbo driers, primary wash basins and silos all connected in varying sequences with complicated machine arrangements and unsatisfactory results before the separation process proper takes place and with varying, generally unsatisfactory results. For example, friction separators are sometimes mounted upstream of a moist silo which, however, is of no more than little effect because the material is only unsatisfactorily soaked upstream of the friction separator. Even sink-float basins installed upstream as primary washing systems do not reach the intended soaking effect because the residence time of approximately 0.1 to 2 minutes, depending on the length and construction of the basins, is too short. Following subsequent separation by the sink-float method or a hydrocyclone process, the separating liquid has to be additionally removed in a downstream mounted friction or turbo-dryer.

BRIEF DESCRIPTION OF THE INVENTION

One of the objects of the present invention is to improve the processing of refuse mixtures including plastic waste to such an extent that the mechanical expenditure for separation by density is markedly reduced and that this separation process at the same time is optimized such that a clear improvement of the separating result can be attained.

According to the present invention, the problem as defined is solved by an apparatus for the processing of a refuse mixture including plastic waste particles comprising a functionally connected set of machinery components including a comminutor in which the refuse mixture particles are comminuted to a solids particle size of less than about 15 mm; a container for moistening the comminuted refuse mixture with a liquid and/or steam; a dryer for drying the moistened comminuted refuse mixture; a tank for mixing the dried refuse mixture with a separating fluid; and a centrifuge for separating the separating fluid from the solids wherefrom the solids are discharged sorted into at least two fractions of varying density.

The method of the present invention for the processing of a refuse mixture including plastic waste particles comprises the steps of comminuting the refuse mixture particles to a size of less than about 15 mm; wetting the comminuted refuse mixture by mixing it with a liquid and/or steam; dewatering the resulting wet refuse mixture thereby forming a dewatered product; mixing the dewatered product with a separating fluid thereby forming a suspension; and sorting the suspension by use of a centrifuge into a resulting liquid and at least two solid particle fractions.

The apparatus and method according to the present invention is targeted at a pure-grade separation by preparatory operations optimally matched to the group of substances to be processed, especially plastic wastes which by previous operations had been separated from other constituents that may have been included in the refuse mixtures which, moreover, may have included contaminated wood or other substances or which contain paper in the form of composite materials.

DESCRIPTION OF THE PREFERRED EMBODIMENTS

Figure 1:
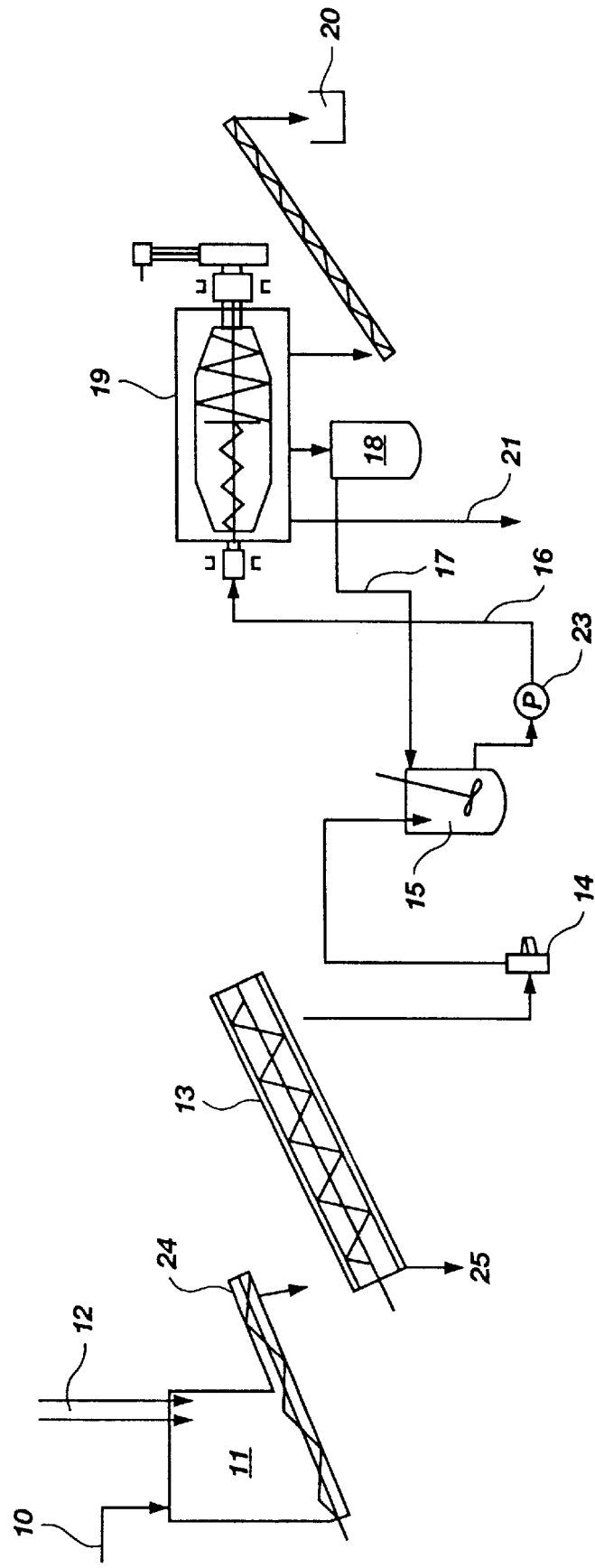
FIG. 1 is a schematic flow sheet of one waste processing system according to the apparatus and method as described and disclosed in the present invention.

The process according to the present invention can be generally divided into the following three substantially in series connected sections: soaking, disintegration and separation; however, the boundaries between the first two sections are variable because during soaking, the substances are in part already disintegrated.

To ensure successful soaking and disintegration, a refuse mixture including a high concentration of plastic waste first has to be reduced by means of a comminutor, e.g. a shredder or cutting mill as is known in the art, to a chip size of less than about 15 mm, preferably 10 to 12 mm, to generate as many exposed edges of cut as possible in the resulting plastic waste chips.

The generation of as many exposed edges of cut as possible, as well as the small size of the comminuted contaminated plastic waste chips, enables, during the subsequent soaking in a container such as a wet silo where the plastic waste chips are treated with a liquid such as water or steam for a retention time of up to about 80 minutes, preferably about 60 minutes, that no more than short distances have to be overcome by the penetrating moisture into the plastic waste chips via the cut edge to completely soak the chips during the retention time available. Consequently, soaking not only proceeds predominantly over the base of the plastic waste chips but also via the many exposed cut edges so that, especially for composite materials such as polypaper or in-mould labels, the moisture can penetrate into the existing interstices at the cut edges thereby infiltrating the individual layers thereof. The admission of liquid and/or steam into the wet silo is generally controlled in such a manner that the reduced refuse mixture reaches a moisture of about 20 to 60% and preferably about 30 to 40%.

To allow for the optimal absorption of the moisture introduced to the plastic waste chips during their retention in the wet silo, at least one mixing device such as a mixing screw as is known in the art can be arranged in the wet silo and provide for an intense mixing of the materials fed into the silo.

The next process step following the soaking process in a wet silo according to the present invention is the disintegration of the soaked plastic waste chips with a simultaneous mechanical dewatering of the soaked material and separation of a part of the contaminants. Accordingly, the soaked material can be transferred from the wet silo to a friction drier as is known in the art, e.g., by means of a discharge screw conveyor. Inside this mechanical drier, the soaked material is flung repeatedly against a screen basket by a high speed rotor (e.g. at 1000 rpm) thereby being subjected to intense mechanical friction while being dewatered at the same time.

Due to this mechanically induced stress, soaked impurities are detached from the plastic waste chips and adhering paper is fiberized and at the same time removed. Part of these detached impurities and paper fibres are discharged from the drier with the separated water during the simultaneous removal of the moisture while the balance of the undesired foreign matter is delivered to a mixing tank jointly with the plastic waste chips. Pneumatic conveying of that mixture has proven successful.

The mixture of plastic waste chips and impurities which, subject to adequately long mechanical treatment in the friction drier, are no longer joined with each other but freely exist next to each other, are intensely mixed with a separating fluid in the mixing tank to attain a relatively homogeneous suspension made up of the solids to be separated and the separating fluid and to remove any still adhering impurities from the plastic waste chips. A mixing period of up to about 5 minutes and preferably 2 to 3 minutes by way of stirring has proven appropriate.

Normally, water is used as the separating fluid on the condition that a density of 1.0 g/cm$^3$ suffices as the cut point. However, other separating fluids may be used as well, provided cut points above or below 1.0 g/cm$^3$ are required. For example, these may be salt solutions for a cut point above 1.0 g/cm$^3$ or alcohol solutions for a cut point below 1.0 g/cm$^3$.

The suspension is then routed from the mixing tank to the separating device which is the last process operation after disintegration. According to the present invention, the separating device can be a sorting centrifuge in which the solids are separated by density within the zone of centrifuge forces and the separating fluid is simultaneously removed so that the separated solids are discharged from the separation centrifuge substantially dry. The separating device known from DE-A-42 08 104 can, for example, be used as the sorting centrifuge. Since the separation in this type of sorting centrifuge takes place at high accelerations (e.g., approximately 1000 to 1200-times the acceleration due to gravity) and high centrifuge speeds wherein a ring of suspension revolving approximately at centrifuge speed is built up inside the centrifuge bowl, the suspension delivered from the mixing tank to the sorting centrifuge is accelerated within fractions of a second to the speed of that revolving suspension ring, e.g., to approximately 50 to 60 m/sec. As a result of this high increase in the velocity of the suspension upon entry into the sorting centrifuge, it is once again subjected to frictional stresses so that any contaminants not yet liberated and any still adhering impurities are generally finally removed from the plastic waste chips.

The density based removal of these last few impurities from the plastic waste chips where the impurities are obtained as a heavy fraction proceeds more extensively and also more reliably than for known separating methods such as sink-float procedures or hydrocyclone methods due to the great forces which act upon the solid particles at an acceleration which can be approximately 1000 to 1200 times the acceleration due to gravity. Purity and the precision of cut are also significantly better for the present process than for known processes and it offers the additional advantage that the plastic waste chips, after separation from the separating fluid, are generally discharged from the centrifuge as a light fraction and the impurities as a heavy fraction so that no additional mechanical dewatering is required.

Another advantage of the process according to the present invention is that, due to the relatively simple process configuration, only small quantities of fines are produced which during later separation can only be captured with difficulty and by complicated means and which entail a high loss of plastics as a resource, for known methods up to 10% and, consequently, mean a burden for the separated water.

Since the apparatus according to the present invention is generally made up of a comminutor, a wet silo, a friction drier, a mixing tank and a sorting centrifuge, the process according to the invention is capable of carrying out the separation of refuse mixtures including high concentration of plastic waste in a simple and compact manner because no more than a small number of individual machines are used at favourable operating costs, high availability and at optimal precision of cut.

Additional particulars, benefits and features of the present invention and one preferred embodiment thereof will be explained in detail further below with reference to one process flow sheet of a refuse processing plant according to the present invention and as shown in accompanying FIG. 1.

The flow sheet which describes the process route from left to right in FIG. 1 begins with the feed 10 of the preliminarily sorted refuse mixture which may include a high concentration of plastic waste such as contaminated plastic waste chips which have been reduced to a size of less than 15 mm or preferably to about 10 to 12 mm by a comminutor (not shown but as is well known in the art) into wet silo 11 (the mixing device inside the wet silo which is also well know in the art has also not been shown). Liquid and/or steam are routed via suitable supply pipes 12 into this wet silo 11 to carry out the soaking of the contaminated plastic waste chips.

The soaked material is transferred by a discharge device 24, e.g., a screw conveyor, to a friction drier 13 in which disintegration of the impurified plastic waste chips takes place along with the simultaneous separation of a portion 25 of the soaking water entrained with contaminants. The mechanically dewatered solids, i.e., the plastic waste chips and the substantially liberated impurities, are delivered, e.g., pneumatically, to the mixing tank 15 by means of a suitable pump or blower 14 to be intensely mixed therein with the separating fluid by means of, e.g., an agitator.

The resulting suspension made up of the solids to be separated and the separating fluid is delivered from the mixing tank 15 by, e.g., a pump 23 and pipeline 16 to the sorting centrifuge 19 where the impurities are separated from the plastic waste chips and the separating fluid from the solid particles. The plastic waste chips which have previously been freed of adhering foreign matter are discharged as light fraction 21 at one end of the sorting centrifuge 19 while the separated foreign matter particles (impurities, paper, etc.) are discharged as heavy fraction 20 at the other end of the sorting centrifuge 19.

For this typical application, the separating fluid leaves the centrifuge 19 at the center, reaches a receiving tank 18 from where it is recycled over a pipeline 17 to the mixing tank 15 so that the separating fluid is routed in a closed circuit and only that quantity of separating fluid has to be replenished which leaves the sorting centrifuge with the solids. It is likewise possible to have the separating fluid not discharged at the center but at one end of the sorting centrifuge, either separate from or jointly with the solids fraction discharged at that end.

It is to be understood that the apparatus and/or process of the present invention is not bound to the plant flow diagram as shown in FIG. 1. Instead, the individual machines and the conveying means connecting these machines can be changed, adapted and/or modified depending on the solid constituents to be separated as long as, and based on the prescribed task and purpose of each individual operation, the general subject matter of the invention with the connected process operations of soaking, disintegration and separation are maintained.

More particularly, although the present invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are offered by way of example to facilitate comprehension of the invention and should not be construed to limit the scope thereof.

What is claimed is:

1. Apparatus for the processing of a refuse mixture including plastic waste particles comprising a functionally connected set of machinery components including a comminutor in which the refuse mixture is comminuted to a solids particle size of less than about 15 mm; a container for moistening the comminuted refuse mixture particles with a liquid and/or steam; a drier for drying the moistened comminuted refuse mixture; a tank for mixing the dried refuse mixture with a separating fluid; and a centrifuge for separating the separating fluid from the solids wherefrom the solids are discharged sorted into at least two fractions of varying density.

2. The apparatus in accordance with claim 1 wherein the container includes at least one mixing screw.

3. A method for the processing of a refuse mixture including plastic waste particles comprising the steps of: comminuting the refuse mixture particles to a size of less than about 15 mm; wetting the comminuted refuse mixture by mixing it with a liquid and/or steam; dewatering the resulting wet refuse mixture thereby forming a dewatered product; mixing the dewatered product with a separating fluid thereby forming a suspension; and sorting the suspension by use of a centrifuge into a resulting liquid and at least two solid particle fractions.

4. The method of claim 3 wherein the wetting step takes place in a wet silo for a retention time of up to about 80 minutes.

5. The method of claim 3 wherein the dewatering step includes the friction treatment of the wet refuse mixture in a friction drier.

6. The method of claim 3 wherein the resulting liquid is recycled for use as the separating fluid.

\* \* \* \* \*